(12) United States Patent
Kaszynski et al.

(10) Patent No.: US 8,118,484 B2
(45) Date of Patent: Feb. 21, 2012

(54) THERMOCOUPLE TEMPERATURE SENSOR WITH CONNECTION DETECTION CIRCUITRY

(75) Inventors: Robert J. Kaszynski, Mendota Heights, MN (US); Charles E. Goetzinger, Chanhassen, MN (US)

(73) Assignee: Rosemount Inc., Bloomington, MN (US)

( * ) Notice: Subject to any disclaimer, the term of this patent is extended or adjusted under 35 U.S.C. 154(b) by 514 days.

(21) Appl. No.: 12/384,011

(22) Filed: Mar. 31, 2009

(65) Prior Publication Data
US 2010/0246630 A1 Sep. 30, 2010

(51) Int. Cl.
*G01K 7/02* (2006.01)
(52) U.S. Cl. ............................................. 374/179; 374/1
(58) Field of Classification Search .............. 374/1, 170, 374/171, 172, 179; 136/200, 224
See application file for complete search history.

(56) References Cited

U.S. PATENT DOCUMENTS

| | | | |
|---|---|---|---|
| 2,647,237 A | 7/1953 | Herbst | |
| 3,921,453 A | 11/1975 | Platzer, Jr. | |
| 4,166,243 A | 8/1979 | West et al. | |
| 4,623,266 A | 11/1986 | Kielb | |
| 4,936,690 A | 6/1990 | Goetzinger | |
| 5,499,023 A | 3/1996 | Goldschmidt | |
| 6,344,747 B1 | 2/2002 | Lunghofer et al. | |
| 6,983,223 B2 | 1/2006 | Schuh | |
| 7,131,768 B2 * | 11/2006 | Habboosh | 374/208 |
| 2008/0013598 A1 | 1/2008 | Perotti et al. | |
| 2008/0133170 A1 | 6/2008 | Engelstad | |
| 2008/0144693 A1 * | 6/2008 | Sato | 374/1 |
| 2009/0080490 A1 * | 3/2009 | Mowry et al. | 374/1 |
| 2011/0268152 A1 * | 11/2011 | Becker et al. | 374/179 |

FOREIGN PATENT DOCUMENTS

| | | |
|---|---|---|
| EP | 0 917 028 | 5/1999 |
| JP | 2008107307 A | 5/2008 |

OTHER PUBLICATIONS

The Search Report and Written Opinion of the International Searching Authority in counterpart Foreign Application No. PCT/US2010/000968 filed Mar. 31, 2010.

* cited by examiner

*Primary Examiner* — G Bradley Bennett
(74) *Attorney, Agent, or Firm* — Kinney & Lange, P.A.

(57) ABSTRACT

An assembly includes a thermocouple, a cold junction sensor, and a circuit. The thermocouple has a process end and a cold junction end. The cold junction end has first and second cold junction terminals. The cold junction sensor is supported near the cold junction end and configured to measure temperature at the cold junction end. The circuit is electrically connected to the cold junction sensor and to the first and second cold junction terminals. The circuit is configured to produce a thermocouple signal as a function of voltage across the first and second cold junction terminals and to produce a cold junction sensor signal as a function of temperature of the cold junction end as measured by the cold junction sensor. The circuit is further configured to calculate a correlation between the thermocouple signal and the cold junction sensor signal.

20 Claims, 3 Drawing Sheets

THERMOCOUPLE TEMPERATURE SENSOR WITH CONNECTION DETECTION CIRCUITRY

BACKGROUND

The present invention relates to thermocouples, and in particular, to thermocouple connections. Thermocouples are a widely used type of temperature sensor. At a basic level, a thermocouple comprises positive and negative leads, made of dissimilar metals, coupled together at one end, commonly called a process end, process junction, hot end, hot junction, or main junction. The other end is commonly called a cold end, or a cold junction. Typically, the hot junction is exposed to an environment with an unknown temperature and the cold junction is exposed to an environment with a known temperature. Electrical voltage is then measured across the cold junction.

Measuring voltage across the cold junction in this manner indicates a temperature difference between the unknown temperature and the known temperature. This is because any metal will generate a voltage when exposed to a thermal gradient. A given metal tends to generate a predictable voltage as a function of the thermal gradient magnitude; however, different metals generate different voltages when exposed to the same gradient. Therefore, a thermocouple made from two different metals will create two different voltages between the hot junction and the cold junction. Thus, a measurable voltage drop from one cold junction end to the other cold junction end will reliably correspond to a temperature difference between the unknown temperature and the known temperature.

Voltage measured by the thermocouple necessarily depends on which metals are chosen for the positive and negative leads. For example, a type K thermocouple uses chromel for the positive electrode and alumel for the negative electrode. Other metals may be used instead; however, properties of each metal must be known in order to know how to convert the measured voltage into temperature.

In traditional applications, the cold junction of the thermocouple was maintained at a constant known temperature such as 0 degrees C. When the cold junction is in an environment where temperature can vary, temperature at the cold junction can be measured with another thermally sensitive device such as a thermistor, diode, or a resistance temperature detector. An appropriate correction can then be applied to each measurement by the thermocouple to adjust for the varying temperature at the cold junction. This technique is commonly referred to as cold junction compensation.

SUMMARY

According to the present invention, an assembly includes a thermocouple, a cold junction sensor, and a circuit. The thermocouple has a process end and a cold junction end. The cold junction end has first and second cold junction terminals. The cold junction sensor is supported near the cold junction end and configured to measure temperature at the cold junction end. The circuit is electrically connected to the cold junction sensor and to the first and second cold junction terminals. The circuit is configured to produce a thermocouple signal as a function of voltage across the first and second cold junction terminals and to produce a cold junction sensor signal as a function of temperature of the cold junction end as measured by the cold junction sensor. The circuit is further configured to calculate a correlation between the thermocouple signal and the cold junction sensor signal. A method of using the assembly is also included.

DETAILED DESCRIPTION

In general, the present invention provides an apparatus and a method for determining whether positive and negative leads of a thermocouple are correctly connected to temperature sensing circuitry.

Figure 1:
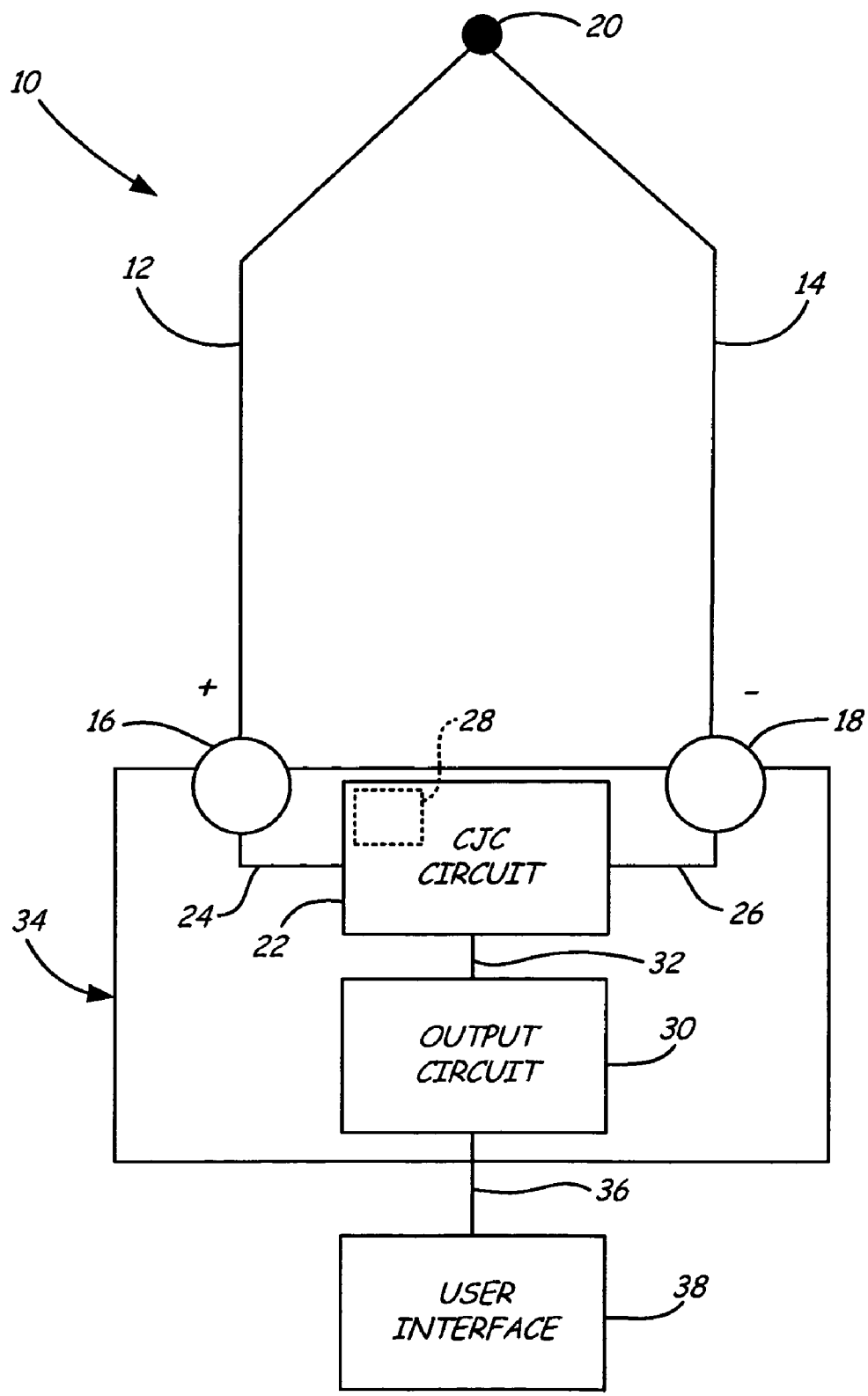
FIG. 1 is a schematic view of a temperature sensor.

FIG. 1 is a schematic view of temperature sensor 10. Temperature sensor 10 includes thermocouple (TC) positive lead 12, TC negative lead 14, positive cold junction (CJ) terminal 16, negative CJ terminal 18, process end 20, cold junction compensator (CJC) circuit 22, CJC positive lead 24, CJC negative lead 26, CJ temperature sensor 28, output circuit 30, output connection 32, transmitter 34, transmitter connection 36, and user interface 38. TC positive lead 12 is coupled to TC negative lead 14 at process end 20. Process end 20 can be exposed to a process environment where knowledge of temperature is desired. Process end 20 is also commonly known as a "main junction" or a "hot junction." TC positive lead 12 is also coupled to positive CJ terminal 16, and TC negative lead 14 is also coupled to negative CJ terminal 18. CJC circuit 22 is connected to positive CJ terminal 16 via CJC positive connection 24 and to negative CJ terminal 18 via CJC negative connection 26. Positive CJ terminal 16 and negative CJ terminal 18 are referred to, together, as the cold junction. Output circuit 30 is connected to CJC circuit 22 via output connection 32. In the illustrated embodiment, positive CJ terminal 16, negative CJ terminal 18, process end 20, CJC circuit 22, CJC positive lead 24, CJC negative lead 26, CJ temperature sensor 28, output circuit 30 and output connection 32 are part of transmitter 34.

TC positive lead 12 can be made of virtually any conductive material suitable for use as a positive lead for thermocouple purposes, such as chromel. TC negative lead 14 can be made of virtually any conductive material suitable for use as a negative lead that is paired with the material chosen for TC positive lead 12, such as alumel. Together, TC positive lead 12 and TC negative lead 14 comprise a thermocouple. CJC circuit 22 can measure voltage between positive CJ terminal 16 and negative CJ terminal 18. CJC circuit 22 also measures temperature at the cold junction using CJ temperature sensor 28. CJ temperature sensor 28 is a temperature sensitive device such as a thermistor, a diode, or a resistance temperature device. CJC circuit 22 then calculates a correction voltage based upon temperature of the cold junction. CJC circuit 22 delivers certain signals to output circuit 30 via output connection 32. These signals include a signal representing voltage measured between positive CJ terminal 16 and negative CJ terminal 18 and a signal representing the correction voltage.

Based upon signals from CJC circuit 22, output circuit 30 can calculate a variety of temperatures, including absolute temperature of the cold junction, temperature difference between the cold junction and process end 20, and absolute temperature of process end 20. These temperature values can be determined using any of the usual techniques such as polynomial interpolation or referencing values in look-up tables. Transmitter connection 36 electrically connects transmitter 34 to user interface 38. In the illustrated embodiment, output circuit 30 is connected to user interface 38 by transmitter connection 36 which may be a wired or a wireless connection. User interface 38 can display temperature values calculated by CJC circuit 22 and output circuit 30 based upon signals received from output circuit 30. In one embodiment, user interface 38 can be a graphical user interface capable of displaying digital temperature values. In other embodiments, user interface 38 can be nearly any user interface capable of communicating information to a user.

Accuracy of these temperature values depends on factors such as materials chosen for TC positive lead 12 and TC negative lead 14 as well as the temperature sensitive device chosen for CJ temperature sensor 28. Moreover, accuracy also depends on all parts of temperature sensor 10 being properly connected. For example, temperature sensor 10 functions under the assumption that TC positive lead 12 is coupled to positive CJ terminal 16 and that TC negative lead 14 is also coupled to negative CJ terminal 18. If these leads were accidentally connected to the wrong terminals, the voltage drop between positive CJ terminal 16 and negative CJ terminal 18 would be opposite that of a temperature sensor that is correctly connected. In such a situation, output circuit 30 would likely calculate an inaccurate temperature value for process end 20. In some circumstances, it may not be apparent to a user that the temperature value is inaccurate.

Figure 2:
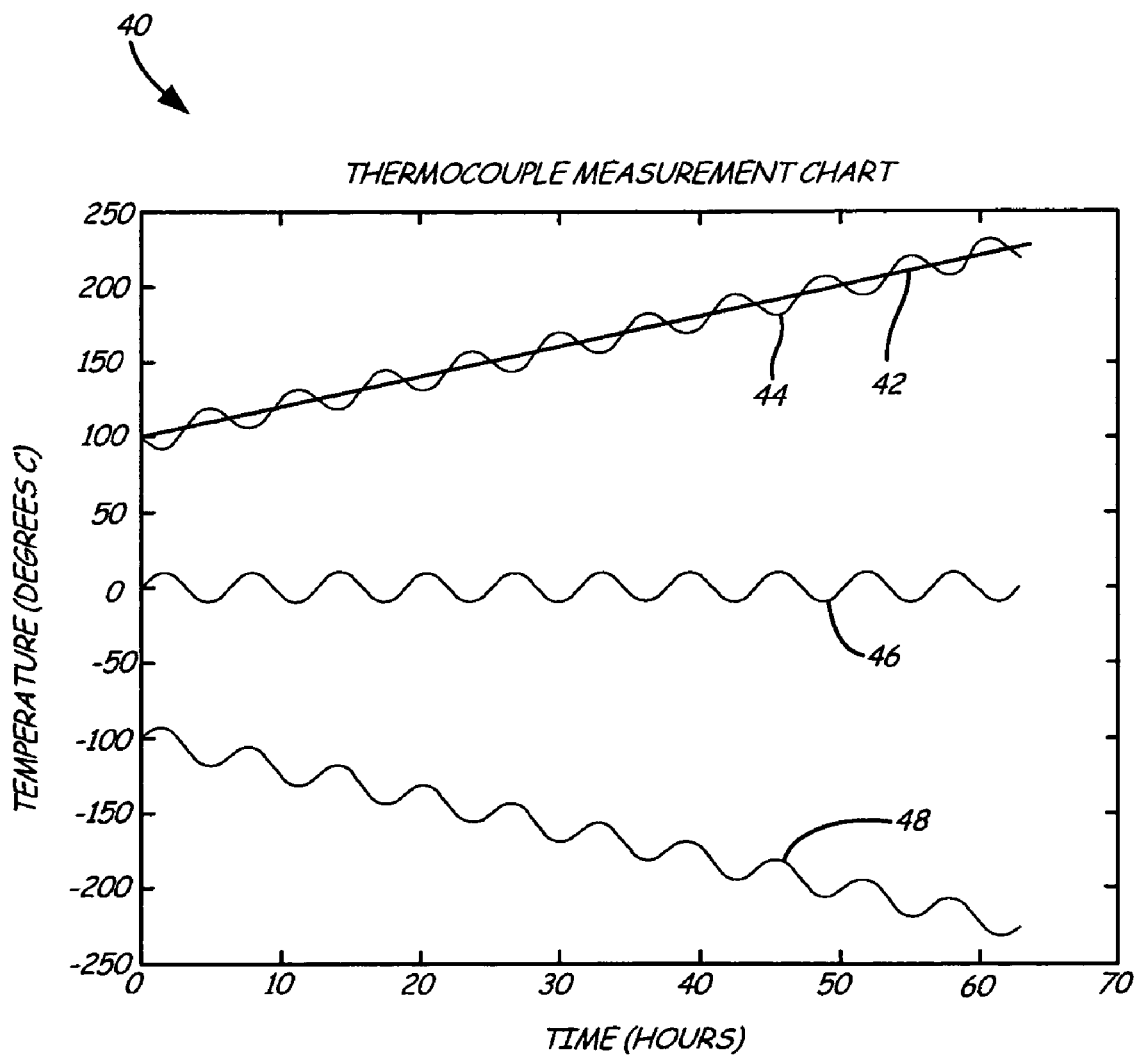
FIG. 2 is a thermocouple measurement chart.

FIG. 2 illustrates thermocouple measurement chart 40. Thermocouple measurement chart 40 plots temperature values as a function of time. Actual line 42 represents an actual process temperature at process end 20 with respect to time. In the illustrated embodiment, the actual process temperature increases from about 100 degrees Celsius (C.) to about 200 degrees C. over the course of about 60 hours at a linear rate. TC line 44 represents the measured temperature difference (temperature of process end 20 minus temperature of the cold junction) with respect to time when all parts of temperature sensor 10 are properly connected. In the illustrated embodiment, the measured temperature difference increases from about 100 degrees C. to about 200 degrees C. over the course of about 60 hours at a varying rate. CJ line 46 represents a measured temperature of the cold junction with respect to time. In the illustrated embodiment, the measured temperature of the cold junction fluctuates around zero degrees C. over the course of about 60 hours. Reverse TC line 48 represents an incorrectly measured temperature difference between process end 20 and the cold junction with respect to time when temperature sensor 10 is reversely connected (i.e. when TC negative lead 14 is coupled to positive CJ terminal 16 and TC positive lead 12 is coupled to negative CJ terminal 18). In the illustrated embodiment, the incorrectly measured temperature difference appears to decrease from about −100 degrees C. to about −200 degrees C. over the course of about 60 hours at a varying rate. Reverse TC line 48 is, effectively, a negative of TC line 44.

It is apparent from thermocouple measurement chart 40 that TC line 44 has an inverse correlation to CJ line 46. When temperature at the cold junction increases, the temperature difference necessarily decreases. This can also be illustrated by the equation: (Actual Process Temperature)−(CJ Temperature)=(Measured TC Temperature Difference). It is also apparent from thermocouple measurement chart 40 that reverse TC line 48 has a positive correlation to CJ line 46. This can also be illustrated by the equation: −[(Actual Process Temperature)−(CJ Temperature)]=(Reversely Measured TC Temperature Difference). Therefore, whether a thermocouple is properly connected can be apparent by comparing the correlation between the cold junction temperature and the measured TC temperature difference.

Figure 3:
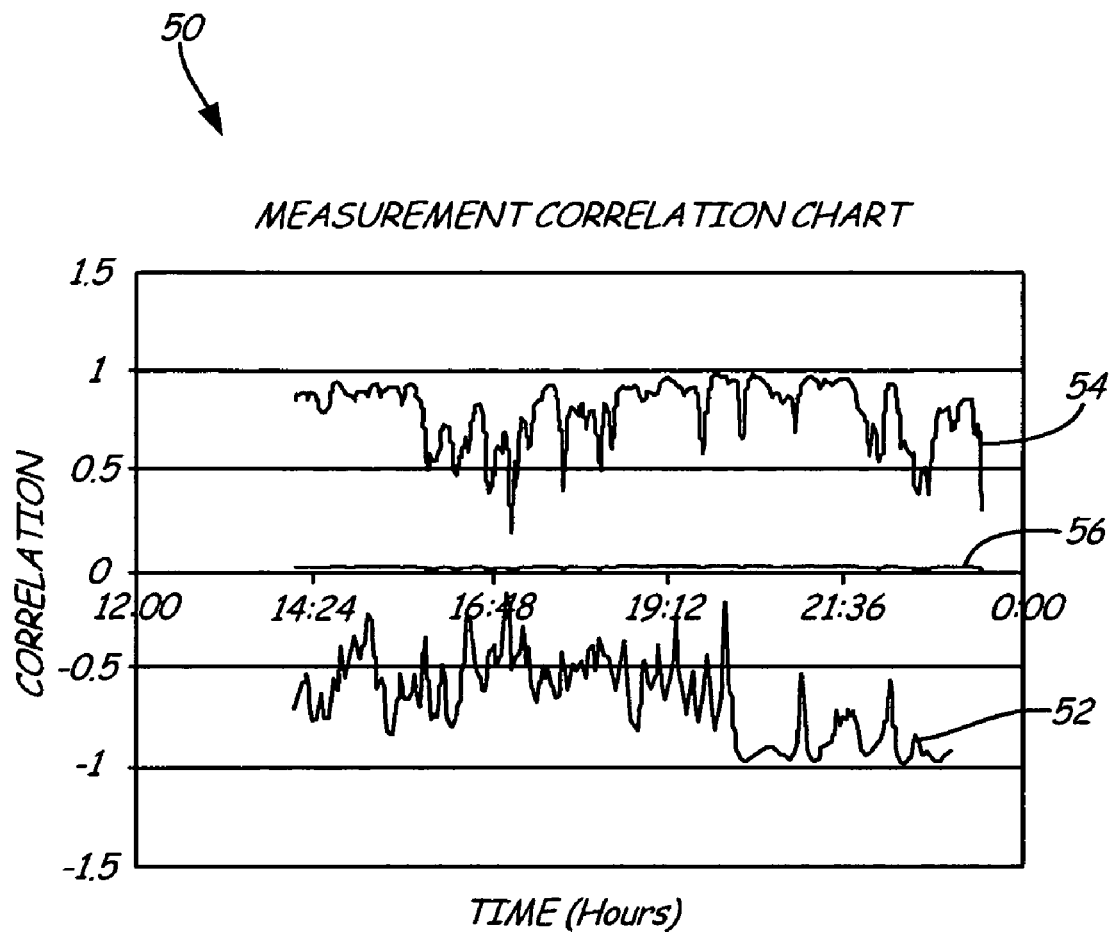
FIG. 3 is a measurement correlation chart.

FIG. 3 illustrates measurement correlation chart 50. Measurement correlation chart 50 plots correlation between the measured cold junction temperature and the measured temperature difference as a function of time. Correct line 52 represents correlation when temperature sensor 10 is correctly connected. In the illustrated embodiment, correct line 52 has a value that fluctuates between 0 and −1 over the course of about 10 hours. Reverse line 54 represents correlation when temperature sensor 10 is reversely connected (i.e. when TC negative lead 14 is coupled to positive CJ terminal 16 and TC positive lead 12 is coupled to negative CJ terminal 18). In the illustrated embodiment, reverse line 54 has a value that fluctuates between 0 and 1 over the course of about 10 hours. Open line 56 represents correlation when temperature sensor 10 has an open circuit (i.e. when either positive CJ terminal 16 or negative CJ terminal 18 is not connected to either of TC positive lead 12 or TC negative lead 14). In the illustrated embodiment, open line 56 has a value of approximately 0 over the course of about 10 hours.

Output circuit 30 can calculate correlation as a function of time based upon data signals received from CJC circuit 22. Correlation can be measured in one of two ways. First, correlation can be measured as a correlation between a time rate of change of temperature measured at the cold junction and a time rate of change of voltage between positive CJ terminal 16 and negative CJ terminal 18. Second, correlation can be measured as a correlation between a time rate of change of temperature measured at the cold junction and a time rate of change of a temperature difference between the cold junction and the process end. Either of these correlations can be useful because the temperature difference between the cold junction and the process end corresponds directly to voltage between positive CJ terminal 16 and negative CJ terminal 18.

Measuring correlation necessarily requires at least some temperature variation at the cold junction. Such variations typically occur naturally, especially over extended periods of time. Accuracy of this method can be increased in settings where temperature variation at the cold junction is relatively large compared to temperature variation at process end 20. Larger temperature variations at the cold junction cause such variations to have a greater effect on the changing temperature difference, pushing the correlation value closer to −1 or 1, and thus increasing the confidence in a conclusion regarding whether temperature sensor 10 is correctly connected. The closer a correlation is to −1 increases the degree of certainty that temperature sensor 10 is correctly connected. The closer a correlation is to 1 increases the degree of certainty that temperature sensor 10 is reversely connected. A correlation value consistently of 0 indicates an open circuit. A correlation value of approaching 0 indicates an inconclusive test or a sensor failure.

Output circuit 30 can drive user interface 38 to signal a user regarding a status of the connection. In one embodiment, user interface 38 can display a chart representing correlation as a function of time, such as measurement correlation chart 50. In another embodiment, user interface 38 can display digital correlation values. In still other embodiments, user interface 38 can use correlation information to provide a conclusory signal to a user regarding the state of the connection. In one embodiment, user interface 38 can provide one of three signals indicating: a correct connection, an incorrect connection, or no connection. Correlation thresholds can be set prior to providing such signals. For example, user interface 38 can provide a signal indicating a correct connection whenever correlation drops below zero or can provide a signal indicating a correct connection only when correlation drops below some predetermined value less than zero. Additionally, user interface 38 can provide a signal indicating a correct connection whenever correlation has dropped below a predetermined threshold for only a moment, can provide the signal indicating a correct connection only when correlation drops below the predetermined threshold for a predetermined period of time, or can provide the signal indicating a correct connection only when average correlation drops below the predetermined threshold for a predetermined period of time. When the cold junction temperature has sufficiently frequent variation, correlation can be completed in 10 minutes or less. User interface 38 can also provide a signal indicating an incorrect connection in a manner similar to that described for a signal indicating a correct connection, except using positive thresholds. User interface 38 can also provide a signal indicating no connection in a manner similar to that described for a signal indicating a correct connection, except using positive and negative thresholds.

If user interface 38 indicates that temperature sensor 10 is reversely connected, the user can switch TC positive lead 12 or TC negative lead 14 to be connected to correct terminals. Similarly, the user can reconnect the leads if user interface 38 indicates an open circuit. If user interface 38 indicates temperature sensor 10 is correctly connected, the user can have greater confidence in temperature values measured by temperature sensor 10.

It will be recognized that the present invention provides numerous benefits and advantages. For example, it provides confidence to a user of a temperature sensor that the thermocouple is, indeed, connected correctly. Additionally, when a temperature sensor is connected in reverse, a user can be notified of the error. This prevents the user from relying on incorrect temperature data and allows the user to correct the improper connection. Moreover, when a lead of a thermocouple becomes disconnected or otherwise broken, a user can be alerted of the error condition. All of these advantages can be particularly helpful in situations when measuring a first environment with a temperature that is near the temperature of a second environment where the cold junction is located.

Although the present invention has been described with reference to preferred embodiments, workers skilled in the art will recognize that changes may be made in form and detail without departing from the spirit and scope of the invention. For example, correlation calculations need not occur actually in the transmitter. Any circuit capable of calculating correlation between the cold junction temperature and the measured TC temperature difference as a function of time can be used for that purpose.

The invention claimed is:

1. A method for monitoring operation of a thermocouple connected to a transmitter, the method comprising:
   sensing temperature with the thermocouple to produce a thermocouple signal as a function of temperature of a hot junction of the thermocouple and temperature of a cold junction of the thermocouple;
   sensing temperature with a cold junction temperature sensor to produce a cold junction sensor signal as a function of temperature of the cold junction; and
   correlating the thermocouple signal and the cold junction sensor signal to produce an indication of whether the thermocouple is connected correctly to the transmitter.

2. The method of claim 1, and further comprising:
   providing a signal of the indication to a user.

3. The method of claim 2, wherein the signal is a displayed chart of correlation as a function of time.

4. The method of claim 1, and further comprising:
   providing a first signal to a user in response to a positive correlation; and
   providing a second signal to the user in response to a negative correlation.

5. The method of claim 4, and further comprising:
   providing a third signal to the user in response to an approximately zero correlation.

6. The method of claim 1, and further comprising:
   calculating an average correlation value of the thermocouple signal to the cold junction sensor signal; and
   providing a first signal to a user in response to an average correlation value that exceeds a predetermined positive value.

7. The method of claim 6, and further comprising:
   reconnecting the thermocouple to the transmitter, in response to the first signal, so that a first cold junction end of the thermocouple that was previously connected to a first terminal of the transmitter is now connected to a second terminal of the transmitter and a second cold junction end of the thermocouple that was previously connected to the second terminal is now connected to the first terminal.

8. The method of claim 6, wherein the average correlation value is calculated over a period of time when the second temperature varies.

9. The method of claim 8, wherein the period of time exceeds about 10 minutes.

10. The method of claim 8, wherein the predetermined positive value is between 0 and 1.

11. The method of claim 8, and further comprising:
    reconnecting the thermocouple to the transmitter, in response to the first signal, so that a first cold junction end of the thermocouple that was previously connected to a first terminal of the transmitter is now connected to a second terminal of the transmitter and a second cold junction end of the thermocouple that was previously connected to the second terminal is now connected to the first terminal.

12. The method of claim 8, and further comprising:
    providing a second signal to the user in response to an average correlation value that is less than a predetermined negative value.

13. The method of claim 12, and further comprising:
    providing a third signal to the user in response to an average correlation value that is between the predetermined positive value and the predetermined negative value.

14. The method of claim 1, and further comprising:
    providing a temperature signal to the user, the temperature signal representing a temperature value substantially equal to the temperature of the hot junction.

15. A method for connecting a thermocouple to a transmitter, the method comprising:
    connecting first and second cold junction ends of the thermocouple to first and second terminals of the transmitter, respectively;
    exposing a process end of the thermocouple to a first environment with a first temperature and exposing the cold junction ends of the thermocouple to a second environment with a second temperature;
    sensing temperature with the thermocouple to produce a thermocouple signal as a function of a difference between the first temperature and the second temperature;

sensing temperature with a cold junction temperature sensor to produce a cold junction sensor signal as a function of the second temperature; and reconnecting the thermocouple to the transmitter so that the first cold junction end is connected to the second terminal and the second cold junction end is connected to the first terminal if there is a positive correlation between the cold junction sensor signal and the thermocouple signal.

16. An assembly comprising:

a thermocouple having a process end and a cold junction end, wherein the cold junction end has first and second cold junction terminals;

a cold junction sensor supported near the cold junction end and configured to measure temperature at the cold junction end; and a circuit electrically connected to the cold junction sensor and electrically connected to the first and second cold junction terminals, wherein the circuit is configured to:

produce a thermocouple signal as a function of voltage across the first and second cold junction terminals, produce a cold junction sensor signal as a function of temperature of the cold junction end as measured by the cold junction sensor, and calculate a correlation between the thermocouple signal and the cold junction sensor signal.

17. The assembly of claim 16, and further comprising:

a user interface electrically connected to the circuit.

18. The assembly of claim 17, wherein the circuit is configured to drive the user interface to generate a signal indicating whether the thermocouple is connected correctly to the circuit.

19. The assembly of claim 17, wherein the circuit is configured to transmit correlation data and temperature data to the user interface.

20. The assembly of claim 17, wherein the circuit comprises a cold junction compensator.

* * * * *